United States Patent [19]

Yamawaki et al.

[11] Patent Number: 5,241,024
[45] Date of Patent: Aug. 31, 1993

[54] METHOD FOR PRODUCING BUTENE-1 POLYMER

[76] Inventors: Takashi Yamawaki, 20-11, 4-chome, Sakuradai, Ichihara-shi, Chiba-ken; Hideki Imabayashi, 892-banchi, Anegasaki Ichihara-shi, Chiba-ken, both of Japan

[21] Appl. No.: 700,322

[22] Filed: May 9, 1991

Related U.S. Application Data

[63] Continuation of Ser. No. 490,509, Mar. 1, 1990, abandoned, which is a continuation of Ser. No. 306,224, Feb. 3, 1989, abandoned, which is a continuation of Ser. No. 76,961, Jul. 23, 1987, abandoned.

[30] Foreign Application Priority Data

Aug. 21, 1986 [JP] Japan ............................ 61-196266

[51] Int. Cl.$^5$ .................. C08F 4/651; C08F 4/654; C08F 10/08
[52] U.S. Cl. ..................... 526/128; 526/125; 526/137; 526/142; 526/348.6; 526/901; 526/127
[58] Field of Search ............... 526/137, 142, 127, 128

[56] References Cited

U.S. PATENT DOCUMENTS

| | | | |
|---|---|---|---|
| 4,393,182 | 7/1983 | Goodall et al. | 526/125 |
| 4,442,225 | 4/1984 | Takitani et al. | 526/142 |
| 4,490,475 | 12/1984 | Bailly et al. | 526/125 |
| 4,503,203 | 3/1985 | Golembeski et al. | 526/901 |
| 4,724,255 | 2/1988 | Löfgren et al. | 526/125 |

FOREIGN PATENT DOCUMENTS 3501858 7/1986 Fed. Rep. of Germany ...... 526/351
61-9409 1/1986 Japan ............................ 526/125

*Primary Examiner*—Edward J. Smith

[57] ABSTRACT

A process for producing a butene-1 polymer is disclosed which is characterized in that, in a process for producing a homopolymer of butene-1 or a copolymer of butene-1 and α-olefin other than the butene-1 in the presence a catalyst obtained from a solid catalyst component (A), an organic aluminium compound (B) and an electron donating compound (C) and under the condition of vapor phase polymerization, the solid catalyst component (A) is a non-layer solid catalyst component obtained by producing a carrier by chlorinating at least one kind of organic magnesium compounds represented by formula

$$MgR'R'' \qquad (1)$$

wherein R' and R'', which may be the same or different, each represents an alkyl group having 1 to 20 carbon atoms, with at least one kind of chlorinating agents, the carrier produced is contacted in the presence of the electron donor with a titanic halide at a temperature of −25° to +180° C., and the electron donating compound (C) is a heterocyclic compound represented by

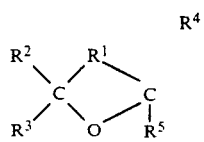
(2)

7 Claims, 3 Drawing Sheets

METHOD FOR PRODUCING BUTENE-1 POLYMER

This application is a continuation of application Ser. No. 490,509 filed Mar. 1, 1990 now abandoned, which is a continuation of application Ser. No. 306,224 filed Feb. 3,1989 now abandoned, which is a continuation of application Ser. No. 076,961 filed Jul. 23, 1987 now abandoned.

FIELD OF THE INVENTION

This invention relates to a process for producing a butene-1 polymer, and more particularly to a process for producing a butene-1 polymer which is suitable for molding e.g., a pipe, in the presence of a high activity catalyst, taking advantage of a vapor phase polymerization.

BACKGROUND OF THE INVENTION

Heretofore, there have been proposals on a process for producing a polybutene-1 polymer having a high crystal property. However, most of them use a titanium trichloride as a catalyst to conduct a solution polymerization and a slurry polymerization. On the other hand, it is foreseen that if a butene-1 polymer could be produced by means of a vapor phase polymerization, the process would be simplified and production costs would be reduced. Because of this reason, there have been proposals which suggest possibilities of a vapor phase polymerization of a butene-1. However, there remained various problems yet to be solved in order to put into practice the process according to this kind of proposals in an industrial scale.

For example, a butene-1 polymer, when compared with polyethylene and polypropylene, has a strong affinity for a hydrocarbon solvent. Accordingly, if a small amount of solvent should be accompanied when a catalyst component is supplied to a vapor phase polymerization system, polymers would be more easy to coagulate each other. As a result, it becomes difficult to effect a stable operation for a long period or to actuate the apparatus.

When a vapor phase polymerization is carried out using a catalyst of a titanium trichloride catalyst (see JP-A-192716/85) conventionally often used, a catalyst of a magnesium chloride catalyst (see JA-A-6205/84) and the like, the catalytic activity becomes weak, a stereoregularity of the butene-1 polymer obtained is insufficient and the advantage resulting from the use of the vapor phase polymerization method is not sufficiently enjoyed.

SUMMARY OF THE INVENTION

It is an object of the present invention to provide a process for producing a butene-1 polymer by the use of a high activity catalyst.

Another object of the present invention is to provide a process for producing a butene-1 polymer having a high stereoregularity by the use of a vapor phase polymerization method.

A further object of the present invention is to provide a process for producing a butene-1 polymer having a small content of a catalyst residue.

A still further object of the present invention is to provide a process for producing a butene-1 polymer under a stable operation condition which is suitably used for molding a molded product such as a pipe.

In order to achieve the above objects there is essentially provided a process for producing a butene-1 polymer characterized in that, in a process for producing a homopolymer of butene-1 or a copolymer of butene-1 and α-olefin other than the butene-1 in the presence a catalyst obtained from a solid catalyst component (A), an organic aluminium compound (B) and an electron donating compound (C) and under the condition of vapor phase polymerization, the solid catalyst component (A) is a non-layer solid catalyst component obtained by producing a carrier by chlorinating at least one kind of organic magnesium compounds represented by formula wherein R' and R", which may be the same or different, each represents an alkyl group having 1 to 20 carbon atoms, with at least one kind of chlorinating agents, the carrier produced is contacted in the presence of the electron donor with a titanic halide at a temperature of $-25°$ to $+180°$ C., and the electron donating compound (C) is a heterocyclic compound represented by wherein $R^1$ and $R^4$ each represents a hydrocarbon group, and $R^2$, $R^3$ and $R^5$ each represents a hydrogen atom or a hydrocarbon group, and reaction temperature as the vapor phase polymerization condition is from 45° to 70° C.

Figure 1:
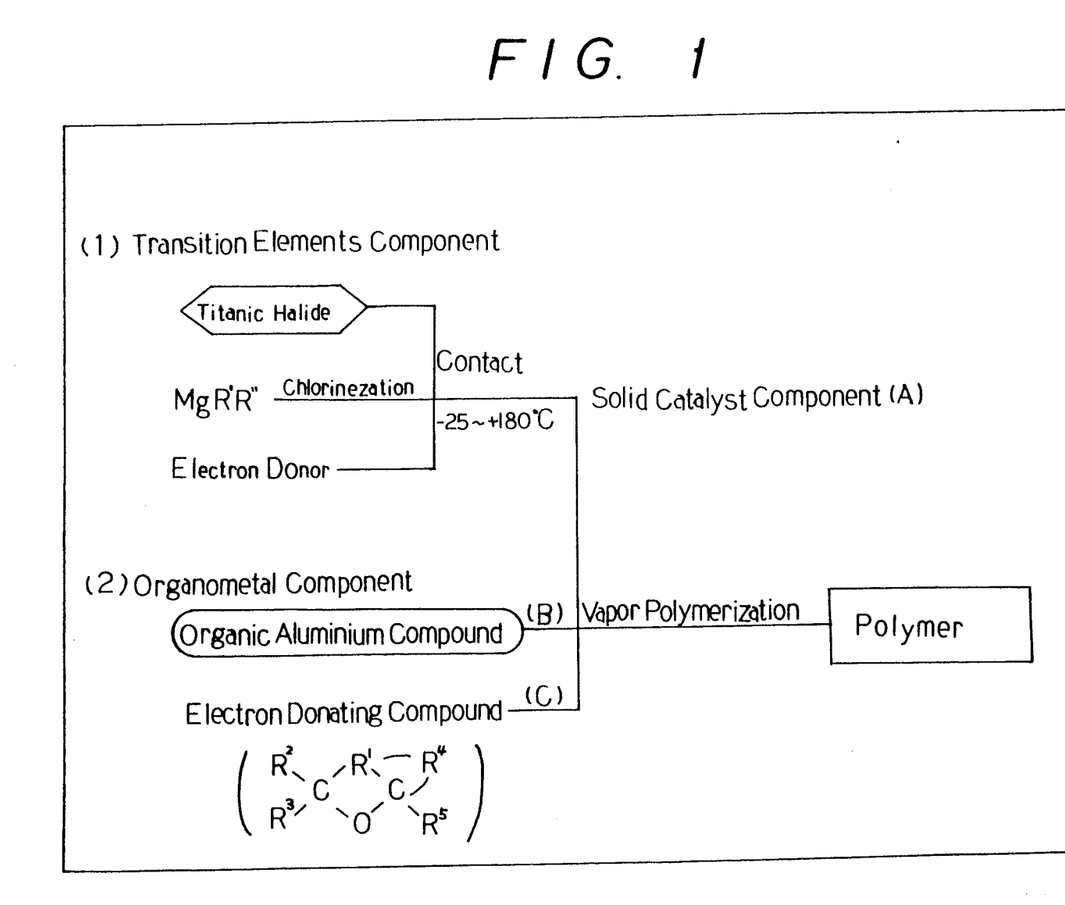
FIG. 1 is an illustration for explaining a preparation of a catalyst.

According to this process, as shown in FIG. 1, a homopolymer of butene-1 or a copolymer of butene-1 and α-olefin other than the butene-1 is produced in the presence of a catalyst obtained from a particular solid catalyst component (A), an organic aluminium compound (B) and a particular electron donating compound (C) and under the condition of vapor phase polymerization.

DETAILED DESCRIPTION OF INVENTION

1. Solid Catalyst Component (A)

The above described solid catalyst component (A) is prepared from a non-layer solid catalyst component obtained by producing a carrier by chlorinating at least one kind of organic magnesium compounds represented by formula wherein R' and R", which may be the same or different, each represents an alkyl group having 1 to 20 carbon atoms, with at least one kind of chlorinating agents, and the carrier produced is contacted in the presence of the electron donor with a titanic halide at a temperature of −25° to +180° C. If a solid catalyst component other than the afore-mentioned one, such as for example a solid catalyst component prepared by using a magnesium chloride as a starting material, is used, there are some problems that the catalytic activity becomes lower, the polymer obtained promotes corrosion of a molding machine since much chlorine remains in the polymer obtained, and so on.

The non-layer catalyst component of the present invention can be obtained by reacting an organic magnesium compound, a chlorinating agent, a titanium halide and an electron donor or a Lewis base.

An alkyl magnesium compound to be used is represented by formula wherein R' and R" each represents the same group as mentioned.

The carbon atoms of the alkyl group are generally 1 to 20, and preferably 2 to 12.

Suitable examples of the alkyl magnesium compound include diethyl magnesium, ethylbutyl magnesium, ethylhexyl magnesium, ethyloctyl magnesium, dibutyl magnesium, butylhexyl magnesium, butyloctyl magnesium and dicyclohexyl magnesium and so on. Of these, the butyloctyl magnesium is preferred.

The chlorinating agents include chlorine or alkyl chloride, e.g., butyl chloride or pentyl chloride, with the butyl chloride being particularly preferred.

The chlorinating can be carried out at a temperature of 0° to 100°, preferably 20° to 60° C. and particularly preferably 20 to 40° C. The electron donor may present in the reacting mixture when chlorinating.

Figure 2:
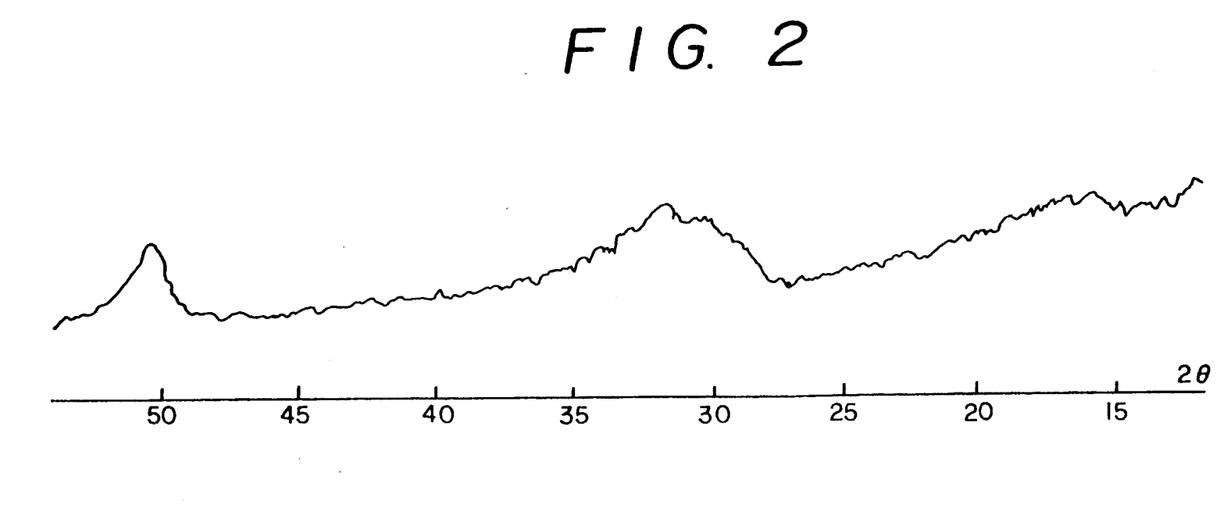
FIG. 2 is an X-ray spectral analysis chart of a carrier composed of a chlorine compound.
Figure 3:
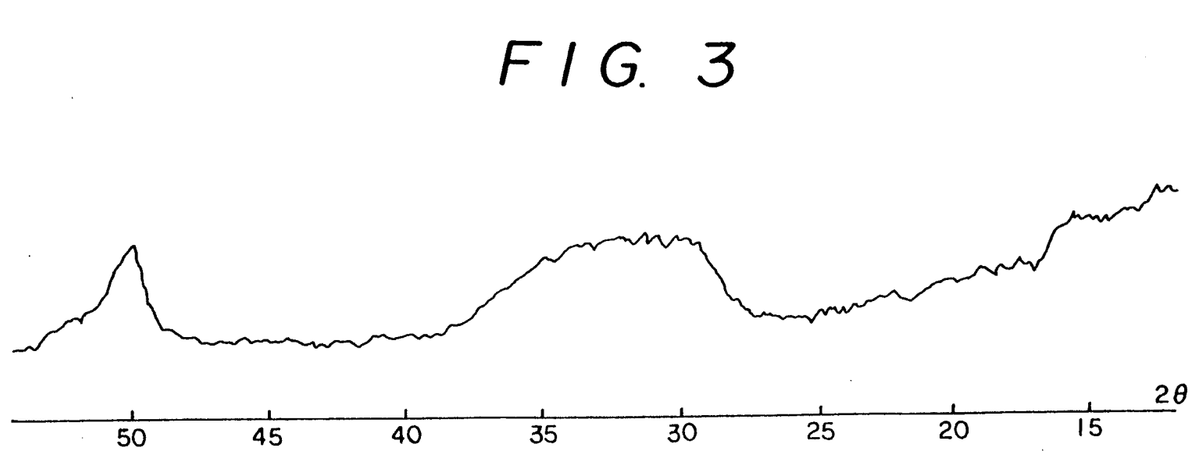
FIG. 3 is an X-ray spectral analysis chart of a catalyst component.

FIG. 2 illustrates an X-ray diffraction spectrum of a solid chlorinating product or carrier. Also, FIG. 3 illustrates a typical X-ray diffraction spectrum of catalyst component serving this carrier as its base (a Seifert MZIII-X-ray diffractmeter is used for the X-ray diffraction method. condition: CuK α-ray, 40 KV, 30mA). When the spectrums shown in FIG. 2 and FIG. 3 are compared, it is clearly understood that both of them are extremely similar. In the spectrum pattern, one comparatively sharp peak can be seen in the position of $2\theta = 50°$ and a wide halo can be seen in the central area of the pattern.

From a scientific view point, a crystal phase of a magnesium chloride cannot be identified from the spectrum (FIG. 2) of the carrier and the final catalyst component (FIG. 3) in the X-ray diffraction method. In these spectrum patterns of X-ray diffraction, no crystal peak appears at $2\theta = 15°$ which is fundamental and peculiar to the magnesium chloride. The peak at $2\theta = 15°$ having a Miller indices (003) in crystallography is apparently related to a repetition of Cl-Mg-Cl layers overlapped in the c axis direction of a crystal of a magnesium chloride structure. As a matter of fact, as reported in literature, it is sure that no phase of the magnesium chloride is present (see JCPDS card No. 25-1156, J.W.C. Chien, et al, Journal of Polymer Science, Vol. 21, pp 737 (1983), U. Giannini, Macromol. Chem., Vol. 5, pp 216 (1981)). An X-ray diffraction chart of a carrier which have been chemically activated after chlorination shows almost none of a crystal structure. The wide peak at $2\theta = 50°$ (110) is the only peak which also can be found in the magnesium chloride. However, it is well known that characterization of the crystal phase is impossible to obtain from one analysis peak and at least three peaks are necessary for that purpose.

Through analysis, it is made clear that the carrier or the solid catalyst component (A) is not stoichiometric with respect to Mg and Cl. The mole ratio of Mg : Cl is sometime so low as about 1 : 0.5. About one half of the carrier is an Mg compound and the rest of it is an organic compound such hydrocarbon and chlorinated hydrocarbon. The presence of these organic compounds exerts an influence on the crystal structure of a produced article. Because of the presence of these organic compounds, a formation of a normal crystal lattice is disturbed, and a certain kind of novel non-layer product having a miniature crystal size is formed.

This novel product has much more active site than the original activated magnesium chloride. By this, the high activity of a catalyst system of the present invention can be at least partially explained in association with a proper surface area and pore volume.

Although such obtained peculiar carrier is then treated with an alcohol, the solid catalyst component shows a fair good activity without such treatment.

As for the alcohol, there can be used aliphatic alcohols such as methanol, ethanol, propanol, butanol, 2-ethyl hexanol, cyclohexanol, methylcyclohexanol, benzyl alcohol, methylbenzyl alcohol and glycol which have one or more number of hydroxyl group.

After chlorination and if required, alcohol treatment, the solid carrier is treated with a titanic halide to form a catalyst component.

According to the present invention, the carrier component is first treated with the titanic halide in the presence of an electron donor, and then if required, treated again at least one time with the titanic halide in the absence of the electron donor. If, according to the conventional art, the treatment with the electron donor should be conducted before the treatment with the titanic halide or the treatment with the electron donor should be conducted during or after the second treatment with the titanic halide, a catalyst component for polymerizing an α-olefin having an extremely poor quality would be obtained.

The treatment with the titanic halide is carried out at the temperature in the range of −25° to +180° C. This treatment is preferably carried out several times separately. One preferred treatment will be described. First, the first time treatment is carried out in the titanic halide cooled. The temperature is 0° or less, and preferably −20° C. or less. The second treatment with the titanic halide is carried out in a high temperature e.g., 70° to 150° C. In this treatment, the titanization is matured in a comparatively long time and preferably at least one hour.

The solid catalyst component (A) is then separated from the liquid phase and washed with a solvent of hydrocarbon group in order to remove impurity, and derivative. The solid catalyst component (A) is dried under a slightly reduced pressure or in a nitrogen atmosphere and at a room temperature or slightly higher temperature, and can be homogenized in a mill. As for the electron donor which is a starting material for preparing the afore-mentioned solid catalyst component (A), there can be used organic compounds containing an oxygen atom, a nitrogen atom, a phosphorus atom or a sulfur atom.

Suitable examples of the electron donor include amines, amides, ketones, nitriles, phosphines, phosphorylamides, esters, ethers, thioethers, thioesters, acid anhydrides, acid halides, acid amides, aldehydes, organic acids, etc.

More specific examples thereof include organic acids such as aromatic carboxylic acids, e.g., benzoic acid, p-oxybenzoic acid, etc., acid anhydrides such as succinic anhydride, benzoic anhydride, p-toluylic anhydride, etc., ketones having 3 to 15 carbon atoms such as acetone, methyl ethyl ketone, methyl isobutyl ketone, acetophenone, benzophenone, benzoquinone, etc., aldehydes having 2 to 15 carbon atoms such as acetaldehyde, propinaldehyde, octaldehyde, benzaldehyde, tolualdehyde, naphthaldehyde, etc., esters having 2 to 18 carbon atoms such as monoesters, e.g., methyl formate, methyl acetate, ethyl acetate, vinyl acetate, propyl acetate, octyl acetate, cyclohexyl acetate, ethyl propionate, ethyl butyrate, ethyl valerate, methyl chloroacetate, ethyl dichloroacetate, methyl methaacrylate, ethyl crotonate, ethyl pivalate, dimethyl maleate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, ethyl p-butoxybenzoate, ethyl o-chlorobenzoate, ethyl naphthoate, etc., aromatic diesters e.g., dimethyl phthalate, diethyl phthalate, dipropyl phthalate, diisobuthyl phthalate, methyl ethyl phthalate, methyl propyl phthalate, methyl isobutyl phthalate, ethyl propyl phthalate, ethyl isobutyl phthalate, propyl isobutyl phthalate, dimethyl terephthalate, diethyl terephthalate, dipropyl terephthalate, diisobutyl terephthalate, methyl ethyl terephthalate, methyl propyl terephthalate, methyl isobutyl terephthalate, ethyl propyl terephthalate, ethyl isobutyl terephthalate, dimethyl isophthalate, diethyl isophthalate, dipropyl isophthalate, diisobutyl isophthalate, methyl ethyl isophthalate, methyl propyl isophthalate, methyl isobutyl isophthalate, ethyl propyl isophthalate, ethyl isobutyl isophthalate, propyl isobutyl isophthalate, etc., γ-butyrolactone, δ-valerolactone, coumarine, phthalide, ethylene carbonate, etc., acid halides having 2 to 15 carbon atoms such as acetyl chloride, benzyl chloride, toluyl chloride, anisyl chloride, etc., ethers having 2 to 20 carbon atoms such as dimethyl ether, diethyl ether, diisopropyl ether, di-n-butyl ether, diamyl ether, tetrahydrofuran, anisol, diphenyl ether, ethylene glycol butyl ether, etc., acid amides such as acetamide, benzoic acid amide, toluylic acid amide, etc., amines such as tributylamine, N,N'-dimethylpiperazine, tribenzylamine, aniline, pyridine, picoline, tetramethylethlenediamine, etc., nitriles such as acetonitrile, benzonitrile, tolunitrile, etc., and the like.

Among them, esters, ethers, ketones, acid anhydrides, etc. are preferred. More preferred electron donors include alkyl esters of an aromatic carboxylic acid, e.g., alkyl (1 to 4 carbon atoms) ester of an aromatic carboxylic acid such as benzoic acid, p-methoxybenzoic acid, p-ethoxybenzoic acid, toluylic acid, etc., diester of an aromatic carboxylic acid such as diisobutyl phthalate, etc., aromatic ketones such as benzoquinone, etc. aromatic carboxylic acid anhydrides such as benzoic anhydride, etc., ethers such as ethylene glycol butyl ether, etc.

Specific examples of the afore-mentioned titanic halide which is one of the starting materials of the solid catalyst component include titanium tetrahalides such as $TiCl_4$, $TiCl_4$, $TiBr_4$, $TiI_4$, etc., alkoxytitanium trihalides such as $Ti(OCH_3)Cl_3$, $Ti(OC_2H_5)Cl_3$, $(n-C_4H_9O)$-$TiCl_3$, $Ti(OC_2H_5)Br_3$, etc., alkoxytitanium dihalides such as $Ti(OCH_3)_2Cl_2$, $Ti(OC_2H_5)Cl_2$, $(n-C_4H_9O)_2$-$Ti_2Cl_2$, $Ti(OC_3H_7)_2Cl_2$, etc., trialkoxytitanium monohalides such as $Ti(OCH_3)_3Cl$, $Ti(OC_2H_5)_3Cl$. $(n-C_4H_9O)_3TiCl$, $Ti(OCH_3)_3Br$, etc.

These can be used singly or as mixtures.

Of these, a titanic halide containing many halogen atoms is preferred, and the titanium tetra halide is particularly preferred.

In time of preparation of the solid catalyst component, there can be used, as the afore-mentioned solvent, those organic solvents which are inert to the magnesium dialkoxide, the electron donor and the titanic halide, for example, aliphatic hydrocarbons such as hexane, heptane, etc., aromatic hydrocarbons such as benzene, toluene, etc., or halogenated hydrocarbons such as mono- and polyhalogenated derivatives of saturated or unsaturated aliphatic hydrocarbons having 1 to 12 carbon atoms, saturated or unsaturated alicyclic hydrocarbons and aromatic hydrocarbons.

At any rate, in such prepared solid catalyst component, halogen/titanium (mole ratio) is 3 to 200 and preferably 4 to 100, and magnesium/titanium (mole ratio) is 1 to 90 and preferably 5 to 70.

2. Organic Aluminium (B)

As for the organic aluminium compound, there is no particular limitation and can be widely used as a compound represented by formula $$AlR^6_\nu X_{3-\nu}$$

$$Al_2R^6X_3$$

wherein $R^6$ represents an alkyl group having 1 to 10 carbon atoms, a cycloalkyl group or an aryl group, v represents a real number of 1 to 3 and X represents a halogen atom such as a chlorine atom, a bromine atom, etc.

Specifically, preferred examples of the aluminium compound represented by the above formula include trialkylaluminiums such as trimethylaluminium, triethylaluminium, triisopropylaluminium, triisobutylaluminium, trioctylaluminium, etc., dialkylaluminium monohalides such as diethlaluminium monochloride, diisopropylaluminium monochloride, diisobutylaluminium monochloride, dioctylaluminium monochloride, etc., alkylaluminium sesquihalides such as ethylaluminium sesquihalide, etc. Of these, trialkylaluminium is preferable and triisobutylaluminium is particularly preferred.

3. Electron Donating Compound (C)

The afore-mentioned electron donating compound (C) according to the present invention is a heterocyclic compound represented by (2)

wherein $R^1$ and $R^4$ each represents a hydrocarbon group and preferably a substituted or unsubstituted, saturated or unsaturated hydrocarbon group having 2 to 5 carbon atoms, and $R^2$, $R^3$ and $R^5$ each represents a hydrogen atom or a hydrocarbon group and preferably a hydrogen atom or a substituted or unsubstituted, saturated or unsaturated hydrocarbon group having 2 to 5 carbon atoms.

If there should be used electron donating compounds (C) other than the above-mentioned heterocyclic compound such as silane compounds and aromatic carboxylic acid esters, the catalytic activity is low and the stereoregularity of the produced polymer is low, too.

Specific examples of the heterocyclic compound include 1,4-cineole, 1,8-cineole, m-cineole, pinol, benzofuran, 2,3-dihydro benzofran (coumaran), 2H-chromene, 4H-chromene, chroman, isochroman, dibenzofran, xanthene, etc.

These various kinds of heterocyclic compounds can be used singly or as mixtures of two kinds or more.

Of the afore-mentioned various kinds of heterocyclic compounds, the 1,8-cineole is preferred.

4. Polymerization

According to the method of the present invention, the butene-1 or the butene-1 and α-olefins other than the butene-1 are polymerized in the presence of the catalyst including the solid catalyst component (A), the organic alminium compound (B) and the specific heterocyclic compound (C) and under the condition of vapor phase polymerization.

As compositions of the catalyst, the afore-mentioned organic aluminium compound (B) is 0.1 to 1000 moles per mole of the titanic halide contained in the solid catalyst component (A) and preferably 1 to 500 moles, while the aforementioned heterocyclic compound (C) is 0.1 to 500 moles per mole of the titanium atoms in the titanic halide contained in the solid catalyst component (A) and preferably 0.5 to 200 moles.

As for the condition of vapor phase polymerization, the polymerization temperature is 45° to 70° C. and preferably 50 to 65° C.

When the polymerization temperature is lower than 45° C., the partial pressure of the butene-1 cannot be made very high due to the necessity to prevent liquefaction. Accordingly, the rate of polymerization cannot be made sufficiently large and it becomes difficult to remove the polymerization heat in industrial scale. On the contrary, when the polymerization temperature is higher than 70° C., the operation of polymerization becomes difficult since polymer particles produced are easily coagulated and attached to the inside wall of a reactor. In addition, the catalytic activity is lowered to prevent a smooth operation of polymerization.

Although the partial pressure of the butene-1 is different depending on the polymerization temperature, it may be in the range where the liquefaction is not taken place in substantial amount. Usually, it is approximately 1 to 15 Kg/cm$^2$.

Further, a molecular weight regulator such as a hydrogen may be coexisted for the purpose of regulating the molecular weight. Furthermore, there may be coexisted an inert gas having a lower boiling point than the butene-1 such as, for example, nitrogen, methan, ethan, propan and the like. Due to coexistence of these inert gases, coagulating tendency of the polymer is much more reduced. In addition, removal of the polymerization heat becomes easy. An effective coexisting amount of the inert gases is 0.2 moles or more per mole of the butene-1.

The vapor phase polymerization can be carried out using a fluidized bed and an agitating fluidized bed. Otherwise, it can be carried out by flowing a gas component into a tubeshaped reactor.

According to the process of the present invention, there can be produced a homopolymer of the butene-1 or a random or a so-called block copolymer of the butene-1 and the α-olefin other than the butene-1.

When production of the homopolymer is intended, the butene-1 alone is supplied to a polymerization reactor and polymerization reaction is carried out in a conventional manner.

On the other hand, when it is intended to produce the random copolymer, the butene-1 and the α-olefin other than the butene-1 are supplied to a reaction reactor such that the content of butene-1 as a monomer unit in the copolymer is from 60 to 99.5 mole % and preferably 70 to 98 mole % and then copolymerization reaction is carried out.

In order to produce the so-called block copolymer, after conducting a polymerization treatment in the first stage where the α-olefin e.g., butene-1 or propylene is singularly polymerized, the butene-1 and the α-olefin other than the butene-1 are copolymerized in the presence of the homopolymer of the α-olefin obtained in the first stage.

As for the α-olefin other than the butene-1, there can be used straight chain monoolefins such as propylene, ethylene, hexene-1, octene-1, etc., and branched chain monoolefins such as 4-methyl-pentene-1, etc. and dienes such as butadiene, etc.

In order to obtain a butene-1 polymer having preferable properties, it is advantageous to use the propylene as the α-olefin other than the butene-1.

When the vapor phase polymerization method is employed, a step of recovering a solvent used in polymerization can be eliminated and as a result a step of drying the resulting polymer can be simplified to a great extent.

Treatment after polymerization in the method of the present invention is carried out in a conventional manner. That is, a polymer powder guided out of the reactor after the vapor phase polymerization may be passed therethrough with a nitrogen gas stream or the like in order to remove an α-olefin, etc., contained therein. Also, if requested, it may be pelletized by an extruding machine. At that time, a small amount of water, alcohol, etc. may be applied in order to completely deactivate a catalyst.

A butene-1 polymer obtained according to the present invention as described in the foregoing, usually has an intrinsic viscosity number [η] of from 1.0 to 7.0 dl/g (135° C.,decalin solution), I.I. (undissolving portion after extracted for 6 hours using Soxhlet extractor in boiling diethylether) of 95% or more and bulk density of 0.20 g/cc or more in many cases. A content of catalyst residue remained in a polymer obtained is further decreased.

As a result, the butene-1 polymer obtained according to the method of the present invention is used as a preferable material for various pipes, etc.

The present invention has the following benefits or advantages.

(1) Since the catalyst used has a high activity, an amount of catalyst residue remained in the resulting polymer can be reduced and as a result the step of removing a catalyst residue from the polymer of butene-1 obtained can be eliminated. In addition, since a harmful residue is little, the problem of corrosion of the molding machine can be eliminated.

(2) Since a polymer powder having a large bulk density can be obtained, it is convenient for a powder transportation.

(3) Since the butene-1 polymer has [$\eta$] of from 0.1 to 7.0 dl/g and excellent in stereoregularity property (I.I.) and anti-creep property, it can be used for molding articles such as pipes which have an excellent appearance.

The method of the present invention will be described in greater detail with reference to the non-limitative examples and comparative examples.

EXAMPLES 1

(1) Preparation of Solid Catalyst Component (a)

A butyloctyl magnesium (20% heptan solution) was put into a flask having a mechanical agitator, a reflux condenser, a gas feed valve and a thermometer, and a solid catalyst component was prepared as follow. That is, a suspension was applied with a nitrogen gas and kept in an inert atmosphere. A butyl chloride was poured from a funnel at a room temperature. Then, a chlorine gas was added at a rate of 5 ml/min. and the butyloctyl magnesium was chlorinated.

Thereafter, a silicon oil was added at 25° to 35° C. and then an ethanol was poured to the mixture. While the ethanol was being poured, a layer of a chlorinated precipitate was accumulated thick. Then, the mixture was agitated for the hour at 40° C. Thereafter, the temperature was raised up to 75° to 80° C. and allowed the solution to be left over night at this temperature.

This high temperature solution was gently added by siphon to an excessive amount of TiCl$_4$ cooled down (−25° C.) and a reaction intermediate member was precipitated in the TiCl$_4$ cooled low temperature. Then, the mixture was heated up to a room temperature. Thereafter, a diisobutylphtalate as the electron donor was added thereto and the temperature was raised up to 100° to 110° C. The mixture was maintained for one hour at this temperature. After the precipitate was settled, it was washed with a heptane of 85° C. 5 to 6 times, and the solution was transferred to another reactor by the siphon. Further, it was added with an excessive amount of TiCl$_4$, and the mixture was agitated for one hour at 110° C. After the precipitate was settled and the solution was transferred by the siphon, a resulting catalyst component was washed with a heptan several times (5 to 6 times at 80° C.) and dried under a weak reduced pressure. In this way, a solid catalyst component (a) as shown in Table 1 was obtained.

(2) Preparation of Catalyst

The solid catalyst component obtained in the above (1) was diluted in 2 mmol of Ti/l and put into a catalyst preparation tub. 30 mmol/l of triisobutyl alminium and 12 mmol/l of 1,8-cineole were supplied to this catalyst preparation tub. Thereafter, a propylene was supplied in the ratio of 50g of propylene per 1 mmol of titanium. The inside of the catalyst preparation tub was heated up to 40° C. and reaction was carried out in order to prepare the catalyst.

(3) Production of Butene-1 Homopolymer 3.6 mM/l (Ti atom conversion) of a Ti catalyst slurry obtained by repreparing the catalyst obtained in the above (2) was supplied from the catalyst preparation tub to a fluidized bed reactor of 100 l having a diameter of 300 mm at the flow rates of 0.15 l/hr., triisobutyl alminium 30 mM/hr., and 1,8-cineole 24 mM/hr. respectively.

A partial pressure of butene-1 was adjusted to 3 Kg/cm$^2$, and that of the nitrogen was adjusted to 4 Kg/cm$^2$ respectively, and the butene-1 and N$_2$ gas were supplied such that superficial gas velocity becomes 35 cm/sec. Discharge of a polymer was adjusted as such that the amount of polymer in the reactor is held constant.

The polymerization temperature was 60° C.

The obtained polymer had the intrinsic viscosity [$\eta$], I.I., bulk density, remaining titanium (analysis method: fluorescence X-ray spectral method], remaining chlorine (analysis method: fluorescene X-ray spectral method), anti-creep property (evaluated based on ASTM D2990) which are shown in Table 2.

EXAMPLE 2

A vapor phase polymerization was carried out in the same manner as in Example 1 except that the supply flow rate of Ti catalyst slurry was 0.083 l/hr. and the partial pressure of hydrogen was 0.06 Kg/cm$^2$.

Various properties of the obtained polymer are shown in Table 2.

EXAMPLE 3

The same procedures as in (1) of the Example 1 were repeated except that a butylethyl magnesium was used in the place of the butyloctyl magnesium, and a solid catalyst component (b) as shown in Table 1 was obtained.

The same procedures as in the Example 2 were repeated by using the obtained solid catalyst component (b).

EXAMPLE 4

(1) Preparation of Solid Catalyst Component

A solid catalyst component (a) was prepared in the same manner as in (1) of the Example 1.

(2) Preparation of Catalyst

A catalyst was prepared in the same manner as in (2) of the Example 1.

(3) Production of Propylene-Butene-1 Copolymer

A propylene-butene-1 copolymer was produced in the same manner as the Example 1 except that a propylene and a hydrogen were newly supplied to a reaction reactor and that the partial pressure of the propylene was adjusted to 0.3 Kg/cm$^2$ and the partial pressure of the hydrogen was adjusted to 0.09 Kg/cm$^2$. Various properties thereof are shown in Table 2.

COMPARATIVE EXAMPLE 1

(1) Preparation of Solid Catalyst Component

The same procedures as in Example 2 were repeated.

(2) Preparation of Catalyst

The same procedures as in Example 1 were repeated except that 1 mmol/l of a diphenyl dimethoxy silane was used in the place of the 1,8-cineole.

(3) Production of Butene-1 Homopolymer

The same procedures were repeated as in 1 except that a diphenyl dimethoxy silane was a flow rate of 3mM/hr in the place of the newly supplied 1,8-cineole.

Various properties of the obtained butene-1 homopolymer are shown in Table 2. Since this butene-1 homopolymer had a very poor hue and a low stereoregularity, merchandise value were little when molded into a pipe. Further, since the power property of the resulting polymer was poor, continuous operation of the polymerization apparatus difficult to perform.

COMPARATIVE EXAMPLE 2

(1) Preparation of Solid Catalyst Component

The same procedures as in the Example 2 were repeated.

(2) Preparation of Catalyst Component

The same procedures as in the Comparative Example 1 were repeated.

(3) Production of Butene-1 Homopolymer

The same procedures as in the (3) of Comparative Example 1 were repeated except that a hydrogen was additionally supplied at a flow rate of 0.02 Kg/cm$^2$.

Since the obtained polymer had a small molecular weight and much amount of remaining metal, it could not be used as a starting material of a pipe at all.

COMPARATIVE EXAMPLE 3

(1) Preparation of Solid Catalyst Component

The same procedures as in the Example 2 were repeated.

(2) Preparation of Catalyst Component

The same procedures as in the Example 1 were repeated.

(3) Production of Butene-1 Polymer

The same procedures as in the Example 1 were repeated except that the flow rate of Ti catalyst slurry was adjusted to 0.32 l/hr., that the polymerization temperature was adjusted to 40° C. and that the partial pressure of butene-1 was adjusted to 2 Kg/cm$^2$.

The obtained polymer had much amount of remaining metal therein and was unsuitable to use as a starting material for molding a pipe.

COMPARATIVE EXAMPLE 4

(1) Preparation of Solid Catalyst Component

The same procedures as in the Example 2 were repeated.

(2) Preparation of Catalyst Component

The same procedures as in the Example 1 were repeated.

(3) Production of Butene-1 Homopolymer

The same procedures as in the Example 1 were repeated except that the flow rate of Ti catalyst slurry was adjusted to 0.55 l/hr. and that the polymerization temperature was adjusted to 75° C.

The obtained polymer had a small molecular weight, much amount of remaining metal and could not be used as a starting material for molding a pipe.

COMPARATIVE EXAMPLE 5

(1) Preparation of Solid Catalyst Component

Dehydrated and purified 5 l of n-hexan, 50 g (4.4 mol) of magnesium chloride and 132 g (0.38 mol) of benzoic acid ethyl were charged to a well dried flask of 10 l and reacted for one hour under reflux. Then, the temperature was raised up to 70° C. and 4.2 Kg (22 mol) of titanium tetrachloride was charged during 50 minutes. The resultant was further reacted for three hours under reflux. Thereafter, the temperature was lowered to 30° C. and the supernatant liquid was removed. Then, 7 l of n-heptan was added thereto and agitated. Thereafter, it was left still and the supernatant liquid was removed. This procedures were repeated twice to effect washing. Thereafter, 5 l of n-hexan was newly charged, the temperature was raised up to 70° C., 4.2 Kg (22 mol) of titanium tetrachloride was poured during 30 minutes and the mixture was reacted for three hours under reflux. Then, the temperature was raised up to 80° C., the supernatant liquid was removed and 7 l of n-heptan was charged to effect washing. The washing was repeated until no chlorine ion was detected. As a result, a solid catalyst component was obtained. When an amount of titanium in a solid catalyst component was measured by a colorimetric analysis, it was known that 2.6 % by weight of titanium was contained therein.

Also, an average grain diameter of the solid catalyst component was 20 um and a geometric standard deviation g was 1.8.

(2) Preparation of Catalyst

The same procedures as in the (2) of Example 1 were repeated.

(3) Production of Butene-1 Homopolymer

The same procedures as in the (3) of Example 1 were repeated except that a reprepared Ti catalyst slurry was supplied to the afore-mentioned fluidized bed reaction reactor at the flow rate of 0.15 l/hr., that a triisobutyl aluminium was supplied to the reactor at the flow rate of 160 mM/hr. and that a toluic acid methyl in the place of the 1,8-cineole was supplied to the reactor at the flow rate of 7.5 mM/hr.

Various properties of the obtained polymer were shown in Table 2.

TABLE 1

| Solid Catalyst Component No. | Mg Compound (ml) | Chlorination T(°C.) l l (min) (ml) | Silicon oil (ml) | Alcohol (ml) | Electron Donor (ml) | TiCl$_4$ (ml) | Composition (%) | | |
|---|---|---|---|---|---|---|---|---|---|
| | | | | | | | Ti | Mg | Cl |
| (b) | 12(BEM) | BuCl, 25° C. 200 Cl$_2$ 60 30 | 100 | 4.5 | 0.47 | 300 150 | 6.0 | — | — |
| (a) | 12 (BOMAG) | BuCl, 30–60° C. 450 Cl$_2$ 60 90 | | 12.5 | 0.95 | 200 200 | 4.4 | 17.4 | 59.2 |

Notes:
BEM: Butyethyl magnesium
BOMAG: Butyloctyl magnesium
Composition: Composition of solid catalyst component

TABLE 2

|  | Example 1 | Example 2 | Example 2 | Example 4 | Comparative Example 1 | Comparative Example 2 | Comparative Example 3 | Comparative Example 4 | Comparative Example 5 |
|---|---|---|---|---|---|---|---|---|---|
| Item 1 | BOM | BOM | BEM | BOM | BOM | BOM | BOM | BOM | MgCl$_2$ |
| Item 2 | IBP | IBP | IBP | IBP | IBP | IBP | IBP | IBP | BAE |
| Item 3 | CIN | CIN | CIN | CIN | DDS | DDS | CIN | CIN | MT |
| Item 4 | 60 | 60 | 60 | 60 | 60 | 60 | 40 | 75 | 60 |
| Item 5 | 0 | 0.02 | 0.02 | 0.03 | 0 | 0.007 | 0.03 | 0 | 0.05 |
| Item 6 | 100 | 180 | 200 | 151 | 5 | 25 | 48 | 27 | 32 |
| Item 7 | 4.7 | 3.2 | 3.1 | 1.0 | 4.8 | 2.2 | 4.5 | 3.2 | 2.2 |
| Item 8 | 97 | 99 | 98 | — | 83 | 98 | 95 | 94 | 92 |
| Item 9 | 0.39 | 0.41 | 0.41 | 0.39 | 0.25 | 0.37 | 0.37 | 0.33 | 0.27 |
| Item 10 | 10 | 6 | 5 | 7 | 200 | 40 | 21 | 37 | 31 |
| Item 11 | 135 | 75 | 80 | 80 | 2700 | 540 | 280 | 500 | 520 |
| Item 12 | — | — | — | 1 | — | — | — | — | — |
| Item 13 | 4800 | 3900 | 4800 | — | 800 | 1600 | 4500 | 1200 | 1100 |

Notes:
BOM; Butyloctyl magnesium
BEM; Butylethyl magnesium
IBP; Diisobutyl phtalate
EB; Ethyl benzoate
CIN; 1,8-Cineole
DDS; Diphenyl dimethoxy silane
MT; Methyl toluate
Item 1; Carrier-magnesium compound, magnesium compound
Item 2; Electron donor
Item 3; Electron donating compound (C)
Item 4; Polymerization temperature (°C.)
Item 5; H$_2$/monomer (mole ratio)
Item 6; Activity (Kg PB/g-Ti)
Item 7; Intrinsic viscosity [η]
Item 8; I.I. (%)
Item 9; Bulk density (g/cc)
Item 10; Remaining Ti (ppm)
Item 11; Remaining Cl (ppm)
Item 12; Propylene/Butene-1 (mole ratio)
Item 13; Anti-creep property [Hr]

What is claimed is:

1. A process for producing a butene-1 polymer which comprises polymerizing butene-1 or polymerizing butene-1 with an alpha-olefin in the vapor phase at a temperature of from 45° to 70° C. in the presence of a catalyst consisting essentially of:

A. a non-layer solid catalyst component obtained by chlorinating an organomagnesium compound of the formula MgR'R" using chlorine and a chlorinated alkyl, wherein R' and R", which may be the same or different, each represents an alkyl group having 1 to 20 carbon atoms, to produce a solid carrier having a mole ratio of Mg:Cl less than that required for MgCl$_2$ and which does not containing MgCl$_2$, adding a silicone oil, treating the carrier with an alcohol, contacting the alcoholtreated carrier with a titanic halide at a temperature of 0° C. or below and then with an electron donor, washing the titanic halide and electron donor treated carrier with heptane, contacting the washed carrier with a titanic halide at a temperature of 70° to 150° C. in the absence of an electron donor, washing the titanic halide treated carrier 5 times with heptane at 85° C., and drying the washed carrier;

B. an organoaluminum compound of the formula AlR$^6_v$X$_{3-v}$, wherein R$^6$ represents an alkyl group having 1 to 10 carbon atoms, a cycloalkyl group or an aryl group, v represents an integer of 1 to 3, and X represents a halogen atom; and C. a cyclic ether of the formula wherein R$^1$ and R$^4$ each represents a hydrocarbon group, and R$^2$, R$^3$ and R$^5$ each represents a hydrogen atom or a hydrocarbon group.

2. A process for producing a butene-1 polymer as claimed in claim 1, wherein said organomagnesium compound is butyloctyl magnesium or butyl ethyl magnesium.

3. A process for producing a butene-1 as claimed in claim 1, wherein said chlorinating agent is butyl chloride.

4. A process for producing a butene-1 polymer as claimed in claim 1, wherein said electron donor is an aromatic diester.

5. A process for producing a butene-1 polymer as claimed in claim 1, wherein said electron donor is diisobutyl phthalate.

6. A process for producing a butene-1 polymer as claimed in claim 1, wherein said titanic halide is titanium tetrachloride.

7. A process for producing a butene-1 polymer as claimed in claim 1, wherein said cyclic ether is 1,8-cineole.

* * * * *

UNITED STATES PATENT AND TRADEMARK OFFICE
CERTIFICATE OF CORRECTION

PATENT NO.   : 5,241,024
DATED        : Aug. 31, 1993
INVENTOR(S)  : Takashi Yamawaki  etal It is certified that error appears in the above-indentified patent and that said Letters Patent is hereby corrected as shown below:

On title page, item [73] add the following:

--Idemitsu Petrochemical Company Limited, Tokyo, Japan; and

Neste Oy Keilaniemi, Finland--. and

After Primary Examiner--- add Attorney, Agent, or Firm--

--Armstrong, Westerman, Hattori, McLeland & Naughton--.

Signed and Sealed this

Fifth Day of July, 1994

BRUCE LEHMAN

*Attest:*

*Attesting Officer*          Commissioner of Patents and Trademarks